United States Patent [19]

McSweeney

[11] Patent Number: 4,707,366
[45] Date of Patent: Nov. 17, 1987

[54] METHOD FOR INCREASING THE RATE OF SOLUBILITY OF FUMARIC ACID AND COMPOSITIONS

[75] Inventor: Daniel R. McSweeney, Plainsboro, N.J.

[73] Assignee: General Foods Corporation, White Plains, N.Y.

[21] Appl. No.: 867,832

[22] Filed: May 27, 1986

[51] Int. Cl.$^4$ .......................... A23L 1/22; A23L 1/226
[52] U.S. Cl. ........................................ 426/96; 426/97; 426/302; 426/650
[58] Field of Search ...................... 426/94, 96, 97, 650, 426/302, 599

[56] References Cited

U.S. PATENT DOCUMENTS

| | | |
|---|---|---|
| 3,108,002 | 10/1963 | Raffensperger et al. ........... 426/650 |
| 3,169,872 | 2/1965 | Rau .................................... 426/650 |
| 3,181,954 | 5/1965 | Inoue et al. ......................... 426/650 |
| 3,330,665 | 7/1967 | Van Ness ............................. 426/650 |
| 3,351,471 | 11/1967 | Demler et al. ...................... 426/650 |
| 3,459,559 | 8/1969 | Harris et al. ........................ 426/650 |
| 3,580,726 | 5/1971 | Dame et al. ......................... 426/650 |
| 3,716,374 | 2/1973 | Pitchon ............................... 426/650 |
| 4,022,924 | 5/1977 | Mitchell et al. ..................... 426/650 |
| 4,622,227 | 10/1986 | Galeeb et al. ....................... 426/650 |

Primary Examiner—Jeanette Hunter
Attorney, Agent, or Firm—Barbara Toop D'Avanzo; Thomas R. Savoie; Daniel J. Donovan

[57] ABSTRACT

A method for increasing the rate of solubility of fumaric acid by grinding the fumaric acid to a set particle size, combining it with a wetting mixture of water, a polyol and an alkali. The product resulting therefrom may be further treated with a metal oxide.

13 Claims, No Drawings

METHOD FOR INCREASING THE RATE OF SOLUBILITY OF FUMARIC ACID AND COMPOSITIONS

FIELD OF THE INVENTION

The present invention relates to a method of increasing the rate of solubility of fumaric acid in water, and especially in cold water, and products therefrom.

DESCRIPTION OF THE PRIOR ART

Acidulents are known to be used in foodstuffs, and in particular are used to provide tartness to dry powdered beverages and dry powered desserts. Up until the present, the primary acidulent used has been citric acid, which exhibits good solubility in cold water but is expensive. The use of fumaric acid in dry powdered beverages and desserts would be a commercial advantage, not only because it is less expensive, but also because of particular properties it exhibits, such as being less hygroscopic.

The use of fumaric acid in foodstuffs is not a new concept. See 14 *Encyclopedia of Chemical Technology* 770 (3rd Ed. 1981) and also Gardner, "Acidulents in Food Processing, Handbook of Food Additives 232 (1972). However, due to the problems associated with fumaric acid, such as low levels of solubility and formation of scum on top of the liquid, it has not often been used commercially.

Increasing the solubility of fumaric acid has been the topic of various articles and patents. In "Solubility of Fumaric Acid", 15(4) *American Laboratory* 88 (1983), William Gasser and Rodrick Stingleman disclosed the increased solubility of fumaric acid in water through the coating of the acid with dialkylesters of sodium sulfosuccinate or coating the acid with hydroxycarboxylic acids of from 2 to 12 carbons, or combining fumaric acid with a surfactant.

In U.S. Pat. No. 3,151,986, it is taught to coat fumaric acid, having a particle size of approximately 75 microns, with between about 0.1% and about 1.0% by weight of the dialkylesters of sodium sulfosuccinate to increase the rate of solubility.

In U.S. Pat. No. 3,370,956 it is disclosed to dry fumaric acid with large amounts (25% to 75%) of acids such as citric acid, or with smaller amounts (1% to 20%) of acids in combination with 0.001% to about 0.7% of a film forming agent. The film forming agents taught are carbohydrates, water-soluble gelatins, surfactants and dioctylsulfosuccinic acid and its salts.

In UK Patent Application GB No. 2 068 705 entitled Cold Water Soluble Fumaric Acid, fumaric acid is slurried with a low DE maltodextrin containing at least 75% by weight of polysaccharides above trisaccharide and the slurry is spray dried.

Although these attempts have had some effect on the solubility of fumaric acid, there has not yet been a solution which is entirely satisfactory in providing rapidly soluble fumaric acid, which can be retained over any substantial length of time.

SUMMARY OF THE INVENTION

The present invention provides a method of treating fumaric acid for use in dry powdered mixes, such as instant beverages or desserts. This method overcomes problems normally associated with its use, such as a slow solubility rate, scum on the surface of the beverage resulting from incomplete dissolution of the acid, and decrease in rate of solubility over shelf time.

The invention incorporates a process for preparing the fumaric acid which comprises grinding or mulling of the fumaric acid to a designated particle size, treating the acid with a wetting mixture which comprises water, a polyol and an alkali.

At this point, the dispersed acid composition may also be mixed with a metal oxide. These oxides prevent particles from floating to the surface due to the presence of entrained and dissolved air in the water.

The final product is then dispersed on another ingredient, such as sugar, or a combination of ingredients, such as fillers, artificial sweeteners, and bulking agents. At that point, it may be dried or agglomerated and dried depending upon its intended use.

DETAILED DESCRIPTION

This invention pertains to a process for preparing and treating fumaric acid for use in water-soluble foodstuffs such as dry powdered beverage and dry powdered dessert mixes.

The granular fumaric acid must first be ground to a fine particle size; a minimum of 80% by weight of the particles of ground acid must be 10 microns or less in diameter, and no more than 90% by weight of the particles of ground acid must be 50 microns or less in diameter. The grinding is preferably carried out in a closed system muller or grinder, such as a grist mill, so as to overcome the problem of dust normally associated with grinding of the acid.

If the ground fumaric acid meets the particle size requirements, the next step is to apply the liquid treatment to the acid within the grinder. Particularly good, uniform results were found when weighted, slightly toed in/out wheels were used. They were effective in distributing a small amount of liquid over a large surface area of acid. It has been found that an addition of from about 4% to about 9%, preferably 6% to 7% by weight of the liquid to the acid works well, and should be mulled for about 10 to 15 minutes. An optimum amount by weight of liquid to the acid is 6.8%.

The liquid treatment or wetting agent is comprised of water, a polyol and an alkali. Preferably the polyol is a polyhydric alcohol, in particular glycerol, which should be present in the liquid treatment in an amount of about 30% by weight, so as to inhibit the drying out of the treated fumaric acid. The purpose of the water is to form hydrous fumaric acid, which is more easily soluble. The alkali, preferably anhydrous disodium phosphate, acts to neutralize the extra fine fumaric particles and form very soluble alkali fumarate. The amount of alkali used will depend upon which alkali is used, as would be known by one skilled in the art. If disodium phosphate is used, it should preferably be used at a level of about 0.24% of the weight of the treated fumaric acid. Without the use of the alkali, these especially fine particles of fumaric acid would not dissolve when present in a mix, such as an instant beverage, but would float to the top and form scum.

The moisture level of the treated fumaric acid, should be kept within the range of from about 3% to about 9% to retain wetability and prevent fracture of the crystals.

In addition, a small amount of a metal oxide, preferably less than one half percent (0.5%) should be added to the treated acid. Treated acid refers to the product resulting after the ground fumaric acid particles have been treated with the liquid mixture or wetting agent.

The addition of a metal oxide, such as magnesium oxide, prevents the lifting of the treated acid to the surface by the entrained air, usually found in tap water. The metal oxide is used in both sugar and sugarless foodstuffs.

In order to obtain a good looking and properly dissolved product, one additional step must be carried out. The fumaric acid must now be dispersed on another ingredient(s). After the acid is treated with the wetting agent, the metal oxide, and any methylcellulose and/or gelatin hydrolysate, and they have all been properly combined, the product therefrom is dispersed on another ingredient(s). In sugar sweetened products this is very easy as all that is required is to mix this final product with sugar. In sugarless products, the final product can be dispersed on a number of ingredients such as artificial or dipeptide sweeteners, fillers and/or bulking agents. In some cases, usually in sugarless foodstuffs, it may be necessary to agglomerate and dry or just dry after dispersing the acid on the other ingredients. However, this is not always the case, as when the acid is dispersed on sugar.

During all the steps set out above it is necessary to continue mixing. It may sometimes be beneficial to continue the grinding during some of these steps, certainly when the wetting agent is added to the ground fumaric acid.

The following example is illustrative, but not limiting in any manner.

EXAMPLE I

A liquid treatment is prepared by combining 30 g of glycerine, 16 g of disodium phosphate, 6 g of a dextrin and 50 cc of water.

1000 g of fumaric acid is ground in a mix muller to a particle size range such that no more than 90% by weight of the particles are 50 microns or less in diameter, and no less than 80% by weight of the particles are 10 microns or less in diameter. At this point 42 g of the above liquid treatment is applied to the acid, by adding the liquid to the muller and solubilizing the acid. The product therefrom is then continually mixed while 13 g of MgO are added. The final product is ready to be dispersed upon the appropriate ingredients depending upon its intended use.

What is claimed is:

1. A process for preparing a fumaric acid-containing composition having an increased rate of solubility which comprises:
   (a) grinding granular fumaric acid to a particle size such that a minimum of 80% by weight of the particles of ground acid are 10 microns or less in diameter and no more than 90% by weight of the particles of ground acid are 50 microns or less in diameter;
   (b) preparing a wetting agent comprising water, a polyol and an alkali; wherein said water is an amount effect to form hydrous fumaric acid, said polyol is in an amount effective inhibit drying out of the treated fumaric acid and said alkali is in an amount effect to neutralize any extra fine fumaric acid particles and
   (c) combining the ground acid with an amount of the wetting mixture effective to increase the solubility of the fumaric acid.

2. The process as set forth in claim 1 wherein the polyol is glycerol.

3. The method as set forth in claim 1 wherein the alkali is disodium phosphate.

4. The process as set forth in claim 1 where the polyol is present in an amount of about 30 percent by weight of the wetting mixture.

5. The process as set forth in claim 1 wherein from about 6 to about 7 percent by weight of the wetting agent is used to treat the fumaric acid.

6. A product according to the process as set forth in claim 1.

7. A process for preparing a fumaric acid-containing composition having an increased rate of solubility which comprises:
   (a) grinding granular fumaric acid to a particle size such that a minimum of 80% by weight of the particles of ground acid are 10 microns or less in diameter, and no more than 90% by weight of the particles of ground acid are 50 microns or less in diameter;
   (b) preparing a wetting mixture comprising water, a polyol and an alkali; wherein said water is in an amount effect to form hydrous fumaric acid, said polyol is in an amount effective inhibit drying out of the treated fumaric acid and said alkali is in an amount effect to neutralize any extra fine fumaric acid particles and
   (c) combining the ground acid with an amount of the wetting mixture effective to increase the solubility of the fumaric acid; and
   (d) mixing the treated acid with a metal oxide in an amount effective to inhibit flotation of the treated acid in water.

8. The process as set forth in claim 7 wherein the polyol is glycerol.

9. The process as set forth in claim 7 wherein the polyol is present in an amount of about 30% by weight of fumaric acid.

10. The process as set forth in claim 7 wherein the alkali is disodium phosphate.

11. The process as set forth in claim 7 where the metal oxide is magnesium oxide.

12. The process as set forth in claim 11 wherein the magnesium oxide is present in levels of not more than 0.5% by weight of the total mixture.

13. A product according to the process as set forth in claim 10.

* * * * *